United States Patent
Ueno

(10) Patent No.: US 9,703,250 B2
(45) Date of Patent: Jul. 11, 2017

(54) ROTATING FORCE TRANSMITTING MECHANISM AND IMAGE FORMING APPARATUS

(71) Applicant: KYOCERA Document Solutions Inc., Osaka (JP)

(72) Inventor: Daijiro Ueno, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/898,898

(22) PCT Filed: Jan. 28, 2015

(86) PCT No.: PCT/JP2015/052370
§ 371 (c)(1),
(2) Date: Dec. 16, 2015

(87) PCT Pub. No.: WO2015/146271
PCT Pub. Date: Oct. 1, 2015

(65) Prior Publication Data
US 2016/0313688 A1   Oct. 27, 2016

(30) Foreign Application Priority Data

Mar. 26, 2014   (JP) .................................. 2014-064169

(51) Int. Cl.
*G03G 21/00* (2006.01)
*F16C 17/00* (2006.01)
(Continued)

(52) U.S. Cl.
CPC ........... *G03G 15/757* (2013.01); *F16C 17/02* (2013.01); *F16C 35/02* (2013.01);
(Continued)

(58) Field of Classification Search
CPC ............. G03G 15/757; G03G 15/0935; G03G 15/0806; G03G 15/0178; G03G 21/1647;
(Continued)

(56) References Cited

U.S. PATENT DOCUMENTS 5,631,726 A * 5/1997 Sawada ................ G03G 15/757
399/111
5,832,345 A * 11/1998 Damji ................ G03G 21/1821
399/111
(Continued)

FOREIGN PATENT DOCUMENTS

JP   07-275959 A   10/1995
JP   08-248717 A   9/1996
(Continued)

OTHER PUBLICATIONS

International Search Report—PCT/JP2015/052370 dated Apr. 28, 2015.

*Primary Examiner* — Robert Beatty
(74) *Attorney, Agent, or Firm* — Studebaker & Brackett PC

(57) ABSTRACT

A rotating force transmitting mechanism has a rotating member supported on a base plate. The base plate is formed with a bearing part in a bottomed cylindrical shape protruded by extruding. The rotating member is formed with a cylindrical rotating shaft part capable of fitting to the bearing part. The rotating member is supported on the base plate such that the rotating shaft part rotates while sliding with the bearing part.

8 Claims, 13 Drawing Sheets

(51) Int. Cl.
  *F16H 57/00*    (2012.01)
  *G03G 15/00*    (2006.01)
  *F16C 35/02*    (2006.01)
  *F16C 17/02*    (2006.01)
  *F16H 57/021*   (2012.01)
  *F16H 57/023*   (2012.01)
  *G03G 21/16*    (2006.01)
  *G03G 15/16*    (2006.01)

(52) U.S. Cl.
  CPC ....... *F16H 57/0031* (2013.01); *F16H 57/021* (2013.01); *F16H 57/023* (2013.01); *G03G 21/1647* (2013.01); *G03G 15/1615* (2013.01); *G03G 2215/0132* (2013.01); *G03G 2221/1657* (2013.01)

(58) Field of Classification Search
  CPC ... G03G 2215/0103; G03G 2221/1606; G03G 2221/1603; G03G 2221/1657; F16C 17/02; F16C 35/02; F16H 57/0031; F16H 57/0037; F16H 57/023; F16H 2057/02095; F16H 57/021
  USPC ......................................................... 399/167
  See application file for complete search history.

(56) References Cited

U.S. PATENT DOCUMENTS

| | | | | |
|---|---|---|---|---|
| 5,845,175 A | * | 12/1998 | Kumar | F16D 1/0858 399/111 |
| 6,076,419 A | * | 6/2000 | Mlejnek | F16C 17/02 384/276 |
| 6,126,356 A | * | 10/2000 | Russell | G03G 15/0935 384/296 |
| 6,467,965 B1 | * | 10/2002 | Wyer | F16C 33/08 384/295 |
| 8,864,301 B2 | * | 10/2014 | Tanaami | B41J 13/076 347/104 |
| 2006/0171739 A1 | * | 8/2006 | Nakaya | G03G 21/1647 399/119 |
| 2012/0060633 A1 | * | 3/2012 | Ishida | B41J 23/025 74/413 |
| 2012/0321346 A1 | * | 12/2012 | Fukamachi | G03G 15/0896 399/119 |
| 2016/0033026 A1 | * | 2/2016 | Tsukahara | F16H 55/17 74/434 |

FOREIGN PATENT DOCUMENTS

| | | | | |
|---|---|---|---|---|
| JP | 09079354 A | * | 3/1997 | |
| JP | 10246060 A | * | 9/1998 | |
| JP | 11125945 A | * | 5/1999 | |
| JP | 2002135522 A | * | 5/2002 | |
| JP | 2002-286019 A | | 10/2002 | |
| JP | 2003-262214 A | | 9/2003 | |
| JP | 2009-036359 A | | 2/2009 | |
| JP | 2013-253696 A | | 12/2013 | |
| KR | 20100079237 A | * | 7/2010 | ............ F16C 35/067 |

* cited by examiner

FIG.12A
FIG.12B
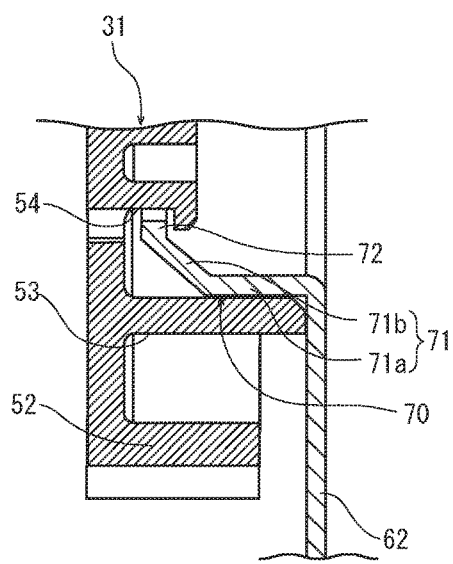
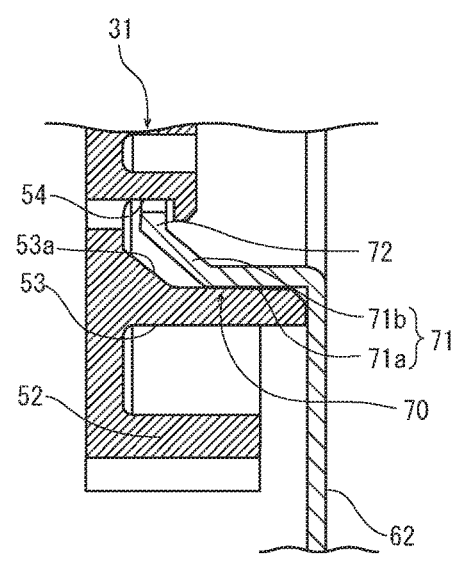

ROTATING FORCE TRANSMITTING MECHANISM AND IMAGE FORMING APPARATUS

TECHNICAL FIELD

The present invention relates to a rotating force transmitting mechanism which transmits a rotating force from a driving source to a driven member via a rotating member supported on a base plate and an image forming apparatus including the rotating force transmitting mechanism.

BACKGROUND

An image forming apparatus, such as a printer or a copying machine, is provided with a rotating force transmitting mechanism which transmits a rotating force from a driving force to a rotating shaft of a rotating member, such as a developing roller, an agitating paddle or a photosensitive drum. In recent years, cost reduction or downsizing of the image forming apparatus has been in progress, and the rotating force transmitting mechanism also requires a measure for cost reduction or downsizing.

With reference to FIG. 13A and FIG. 13B, the prior art of the rotating force transmitting mechanism will be described. FIG. 13A shows a method using a caulking pin 101 and FIG. 13B shows a method using a plastic pin 105.

As shown in FIG. 13A, in the method using the caulking pin 101, a rotating member 103 is fitted to the caulking pin 101 erected on a base plate 102 made of a metal plate material, and the rotating member 103 is prevented from slipping off from the caulking pin 101 by a plastic slip-stop 104. In such method using the caulking pin 101, the rotating member 103 can be supported in a cantilever manner, enabling space saving. For example, the rotating members 103 can be disposed to overlap in an axial direction of the rotating shafts. Also, depending on a construction of the rotating force transmitting mechanism, it is sufficient to use only one base plate 102. However, processes of preparing the caulking pin 101 and pressing the caulking pin 101 against the base plate 102 to be fixed are required, resulting in higher costs owing to an increased number of parts or working processes.

On the other hand, as shown in FIG. 13B, in the method using the plastic pin 105 (or header pin), apertures 106a, 107a are respectively formed at opposite positions of the base plates 106, 107 oppositely disposed to each other and the plastic pin 105 to which the rotating member 108 is fitted is bridged between the apertures 106a and 106b. The method using the plastic pin 105 enables cost reduction compared with the method using the caulking pin 101 and thus is spreading in place of the method using the caulking pin 101. However, in order to prevent from slipping off of the rotating member 108, the rotating member 108 must be supported in a double-supported manner, and space saving, such as in the cantilever manner, is difficult.

On the other hand, in Patent Literature 1, there is disclosed a rotating member mounting structure in which a burring part or projection part is formed by applying several press processes to a metal plate material and then the rotating member is rotatably supported on the burring part or projection part.

PATENT DOCUMENT

[Patent Document 1] Japanese Patent Application Laid-open No. 2002-286019.

SUMMARY OF INVENTION

Problems to be Solved by the Invention

However, the rotating member mounting structure described in the Patent Literature 1 is configured such that the burring part or the like is formed on both of the metal plate materials disposed oppositely to each other and then the rotating shaft of the rotating member is supported between the opposing burring parts. Namely, the rotating member is supported in the double-supported manner and is not configured for the purpose of space saving. Although it is also possible to form the burring part on one metal plate material and support the rotating member to the burring part in the cantilever manner, a countermeasure against slipping off of the rotating member is not taken.

The present invention has been made in view of the circumstance described above, and it is an object of the present invention to provide a rotating force transmitting mechanism which is capable of supporting a rotating member on a base plate in a cantilever manner without causing higher costs and further is capable of preventing slipping off of the rotating member and an image forming apparatus provided with the rotating force transmitting mechanism.

Means of Solving the Problems

The rotating force transmitting mechanism of the present invention is a rotating force transmitting mechanism which transmits a rotating force from a driving source to a driven member via a rotating member supported on a base plate, wherein the base plate is formed with a bearing part in a bottomed cylindrical shape protruded by deep drawing, the rotating member is formed with a cylindrical rotating shaft part capable of fitting to the bearing part and the rotating member is supported on the base plate such that the rotating shaft part rotates while sliding with the bearing part.

By employing such construction, a process of forming the bearing part can be simplified and further the number of parts can be reduced, thus making it possible to achieve space saving and cost reduction of the rotating force transmitting mechanism.

BRIEF DESCRIPTION OF THE DRAWINGS

FIG. 12A is a sectional view showing another example of the bearing part in the rotating force transmitting mechanism according to the second embodiment of the present invention.

FIG. 12B is a sectional view showing still another example of the bearing part in the rotating force transmitting mechanism according to the second embodiment of the present invention.

THE MODE FOR CARRYING OUT THE INVENTION

Hereinafter, with reference to figures, an image forming apparatus according to an embodiment of the present invention will be described.

Figure 1:
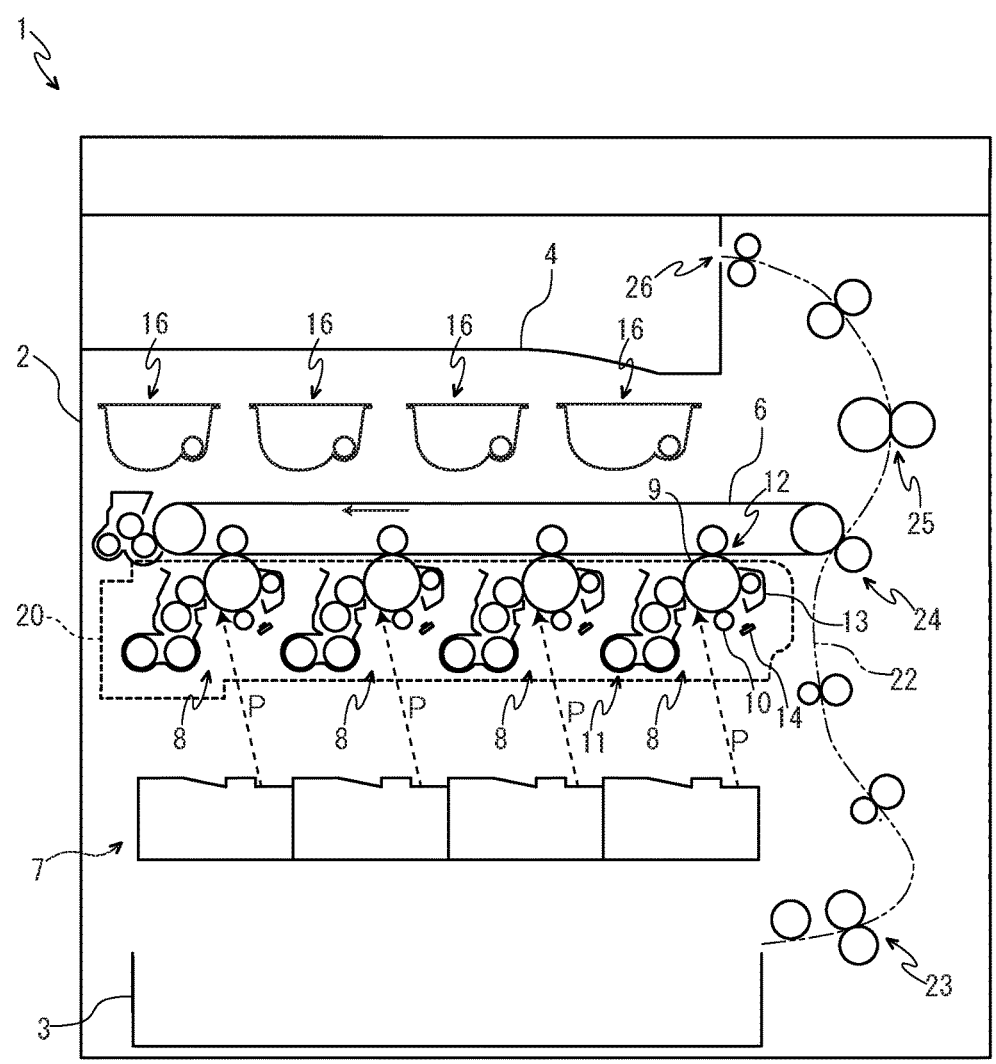
FIG. 1 is a front view schematically showing an entire construction of a color printer according to an embodiment of the present invention.

Firstly, with reference to FIG. 1, the entire structure of a color printer 1 (image forming apparatus) will be described. FIG. 1 is a schematic diagram schematically showing the color printer according to an embodiment of the present invention. In the following description, a front side of the sheet plane of FIG. 1 shows a front side of the color printer 1 and left and right directions are based on a direction viewed from the front side of the color printer 1.

The color printer 1 has a box-like shaped printer main body 2. In the lower part of the printer main body 2, a sheet feeding cassette 3 storing a sheet (recording medium) is provided, and on the upper face of the printer main body 2, an ejected sheet tray 4 is provided.

In the center part inside the printer main body 2, an intermediate transferring belt 6 is bridged around a plurality of rollers. Under the intermediate transferring belt 6, an exposure device 7 containing a laser scanning unit (LSU) is arranged. On the lower side of the intermediate transferring belt 6, four image forming parts 8 are provided for respective toner colors (for example, magenta, cyan, yellow and black). In each of the image forming parts 8, a photosensitive drum 9 is rotatably provided. Around the photosensitive drum 9, a charger 10, a development unit 11, a first transferring part 12, a cleaning device 13 and a static eliminator 14 are arranged along an order of a first transferring process. Above the development units 11, toner containers 16 respectively corresponding the image forming parts 8 are arranged side by side in the left and right directions. On the back side of the four image forming parts, a rotating force transmitting mechanism 20 is arranged. The photosensitive drum 9, the development unit 11 and the others in the image forming part 8 are configured to be driven by a transmitting force transmitted from a driving source (not shown) via the rotating force transmitting mechanism 20.

Along the right side of the inside of the printer main body 2, a sheet conveying path 22 is formed so as to extend vertically from the sheet feeding cassette 3 to the ejected sheet tray 4. At the upstream end of the sheet conveying path 22, a sheet feeding part 23 is provided, at the intermediate portion of the sheet conveying path 22, a second transferring part 24 is provided on one end side (on the right end side in the figure) of the intermediate transferring belt 6. At the downstream portion of the sheet conveying path 22, a fixing device 25 is provided and at the downstream end of the sheet conveying path 22, a sheet ejecting port 26 is provided.

Next, the operation of forming an image by the color printer 1 having such a configuration will be described. When the color printer 1 is powered, various parameters are initialized and an initialization operation, such as a temperature setting of the fixing device 25, is carried out. Then, when image data is inputted from a computer or the like connected to the color printer 1 and then a print start is instructed, the image forming operation is carried out as follows.

After the surface of the photosensitive drum 9 is charged by the charger 10, the exposure device 7 exposes the surface of the photosensitive drum 9 with a laser light (refer to the dotted line P) to form an electrostatic latent image on the surface of the photosensitive drum 9. The electrostatic latent image is then developed into a toner image of respective color by the developing unit 11 using toner supplied from the respective toner container 16. The toner image is first-transferred on the intermediate transferring belt 6 by the first transferring part 12. The above-mentioned operation is repeated in order by the respective image forming parts 8, thereby forming a full color toner image onto the intermediate transferring belt 6. Incidentally, toner and residual electric charge remained on the photosensitive drum 9 is removed by the cleaning device 13 and the static eliminator 14, respectively.

On the other hand, the sheet fed from the sheet feeding cassette 3 by the sheet feeding part 23 is conveyed to the second transferring part 24 in a suitable timing for the above-mentioned image forming operation. Then, in the second transferring part 24, the full color toner image on the intermediate transferring belt 6 is second-transferred onto the sheet. The sheet with the second-transferred toner image is conveyed to a downstream side along the sheet conveying path 22 to enter the fixing device 25, and then, the toner image is fixed on the sheet in the fixing device 25. The sheet with the fixed toner image is ejected from the sheet ejecting port 26 onto the ejected sheet tray 4.

Figure 2:
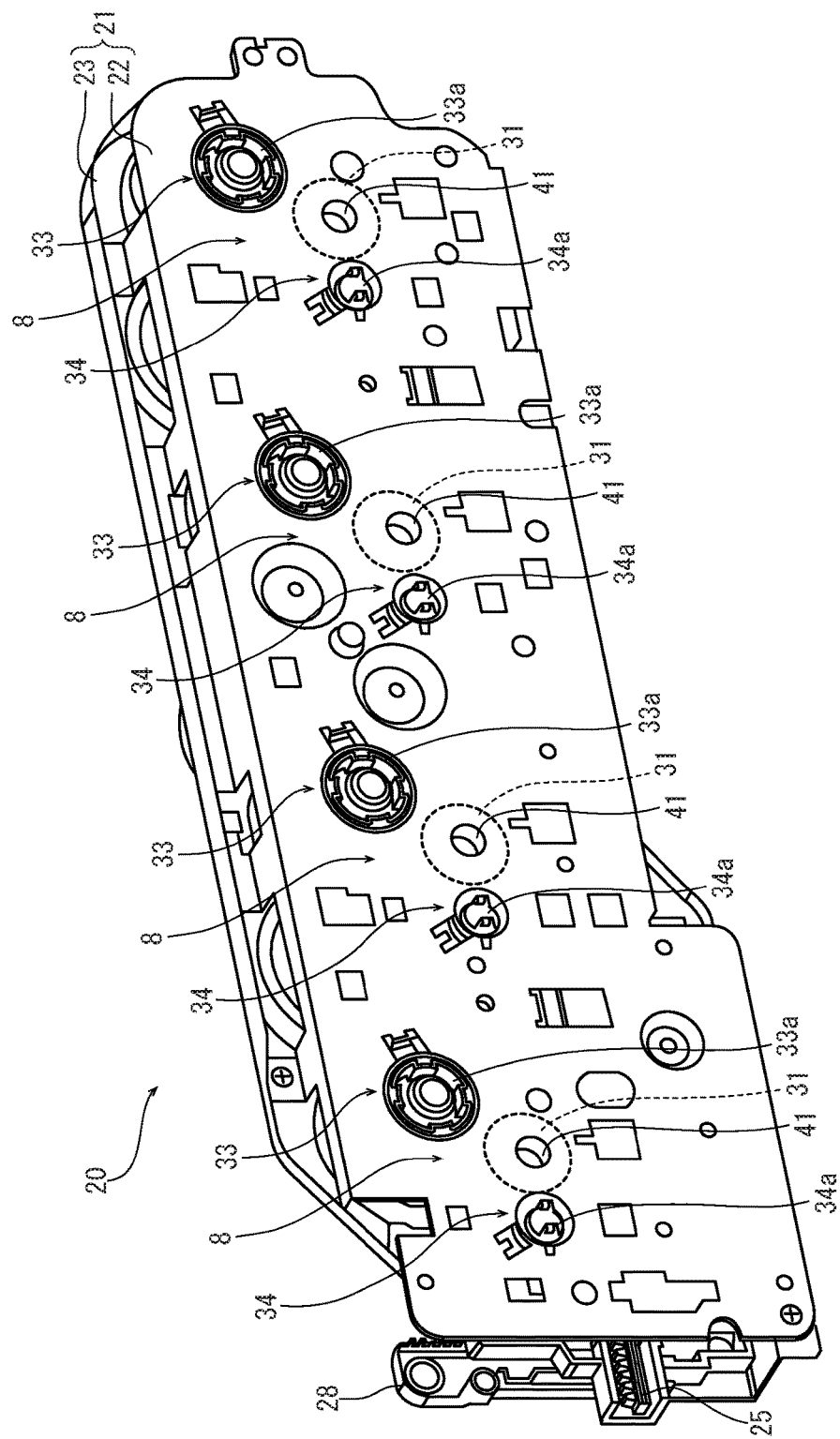
FIG. 2 is a perspective view showing a rotating force transmitting mechanism of the color printer according to a first embodiment of the present invention.

Next, with reference to FIG. 2 and FIG. 3, the rotating force transmitting mechanism 20 will be described. FIG. 2 is a perspective view showing the rotating force transmitting mechanism and FIG. 3 is a front view showing the inside of the rotating force transmitting mechanism.

The rotating force transmitting mechanism 20, as shown in FIG. 2, has a flat housing 21 of a horizontally long rectangular parallelepiped shape. The housing 21 includes an inner plate 22 and an outer plate 23 oppositely disposed each other. Each of the inner plate 22 and the outer plate 23 is in a substantially horizontally long rectangular shape and is made of a metal plate material.

Figure 3:
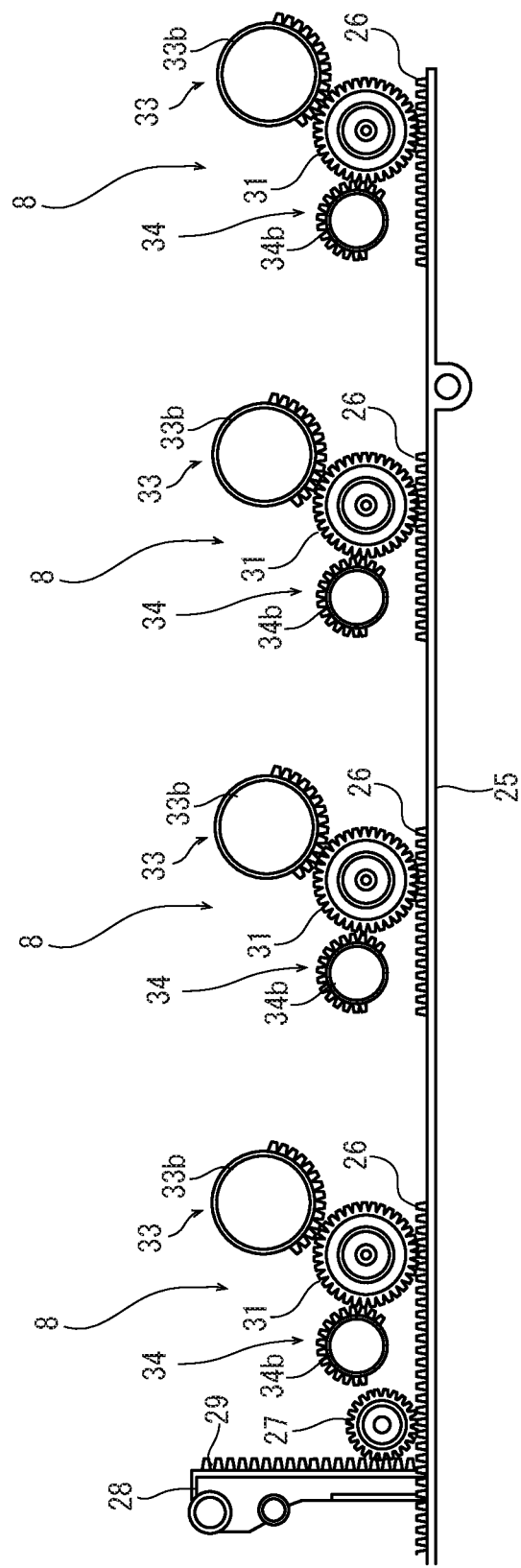
FIG. 3 is a front view showing an inside of the rotating force transmitting mechanism of the color printer according to the first embodiment of the present invention.

Inside the housing 21, as shown in FIG. 3, a movable bar 25 extending in the horizontal direction is supported to be reciprocally moved in the left and right directions. The movable bar 25 is formed with a rack gear 26 at a position corresponding to each image forming part 8. At the left end of the inside of the housing 21, a pinion gear 27 engaging with the rack gear 26 formed at the leftmost end of the movable bar 25 and a lever member 28 which rotates the pinion gear 27 are disposed. The lever member 28 is a vertically long plate-shaped member and is supported to be reciprocally moved in the upward and downward directions. On the right side face of the lever member 28, a rack gear 29 engaging with the pinion gear 27 is formed. When the lever member 28 is moved in the upward and downward directions, the movable bar 25 moves in the left and right directions via the pinion gear 27. Incidentally, inside the housing 21, a gear train provided so as to engage with a rotating shaft of a driving source (not shown), such as a motor, and the others are also disposed.

Inside the housing 21, idle gears 31 engaging with the respective rack gears 26 formed on the movable bar 25 are rotatably supported on the inner plate 22 at positions corresponding to the respective image forming parts 8. Further, in each image forming part 8, a photosensitive drum joint mechanism 33 and a development device joint mechanism 34 are respectively provided at positions corresponding to the rotating shaft of the photosensitive drum 9 and the rotating shaft of the development device 11. The photosensitive drum joint mechanism 33 and the development device joint mechanism 34 perform a transmitting and a transmitting release of a rotating force generated by the driving source to the rotating shaft of the photosensitive drum 9 and the rotating shaft of the development device 11, respectively.

The photosensitive drum joint mechanism 33 and the development device joint mechanism 34 respectively include joint members 33a, 34a (refer to FIG. 2) and driving gears 33b, 34b (refer to FIG. 3). The joint members 33a, 34a are capable of coupling with the rotating shaft of the photosensitive drum 9 and the rotating shaft of the development device 11, respectively. The driving gears 33b, 34b respectively move the joint members 33a, 34a into a coupling position where the joint members 33a, 34a protrude from respective apertures of the inner plate 22 and a coupling release position where the joint members 33a, 34a are retracted in the housing 21. In each image forming part 8, the driving gears 33b, 34b are disposed so as to engage with the idle gear 31.

When the movable bar 25 is moved by operating the lever member 28, the driving gears 33b, 34b rotate via the idle gear 31 to respectively move the joint members 33a, 34a into the coupling position and the coupling release position. At the coupling position, the joint members 33a, 34a are coupled with the respective rotating shafts to rotate the rotating shafts, and at the coupling release position, the joint members 33a, 34a are spaced away from the respective rotating shafts so that the photosensitive drum 9 or the development device 11 can be attached or detached to or from the printer main body 2.

Figure 4:
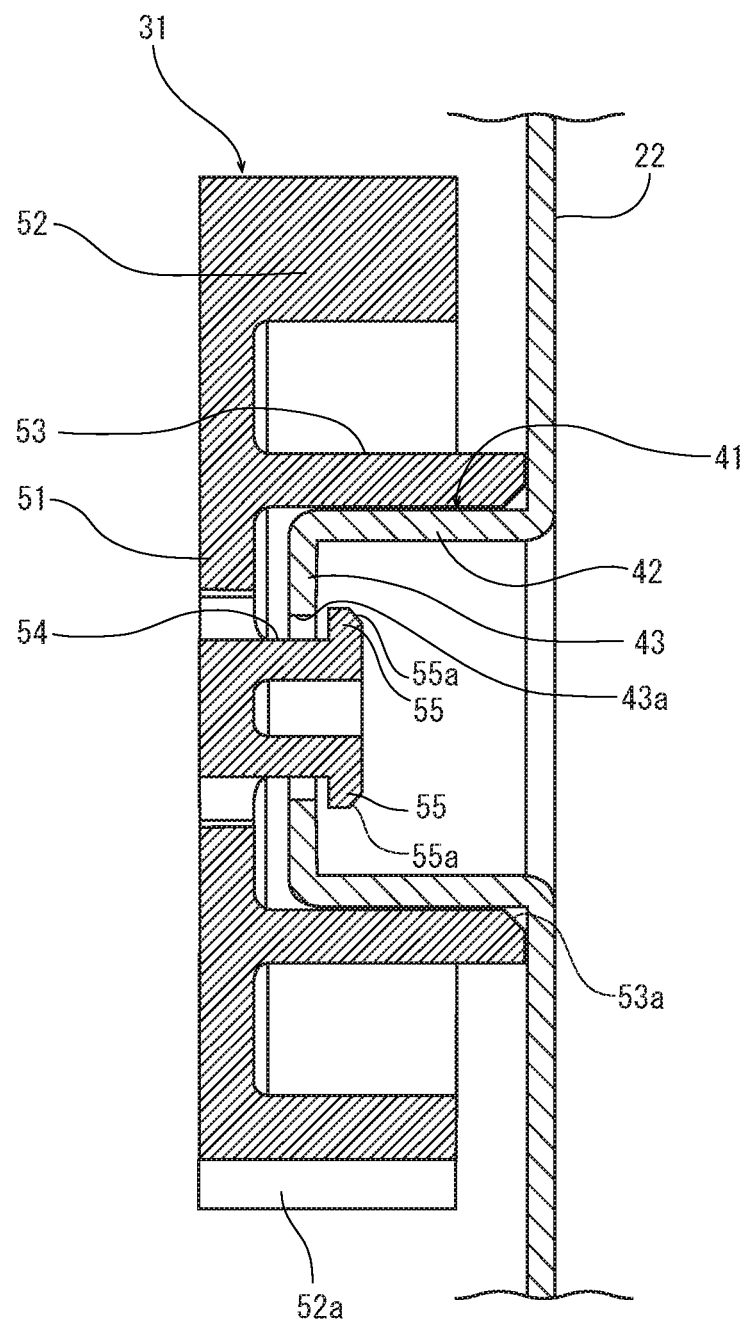
FIG. 4 is a sectional view showing a rotating shaft part of an idle gear and a bearing part of a base plate in the rotating force transmitting mechanism of the color printer according to the first embodiment of the present invention.

Next, with reference to FIG. 4 to FIG. 7, the inner plate 22 and the idle gear 31 supported on the inner plate 22 will be described. FIG. 4 is a sectional view of the idle gear and the inner plate, FIG. 5 is a perspective view of the bearing part, FIG. 6 is a view schematically showing a deep drawing machine and FIG. 7 is a perspective view of the idle gear.

Figure 5:
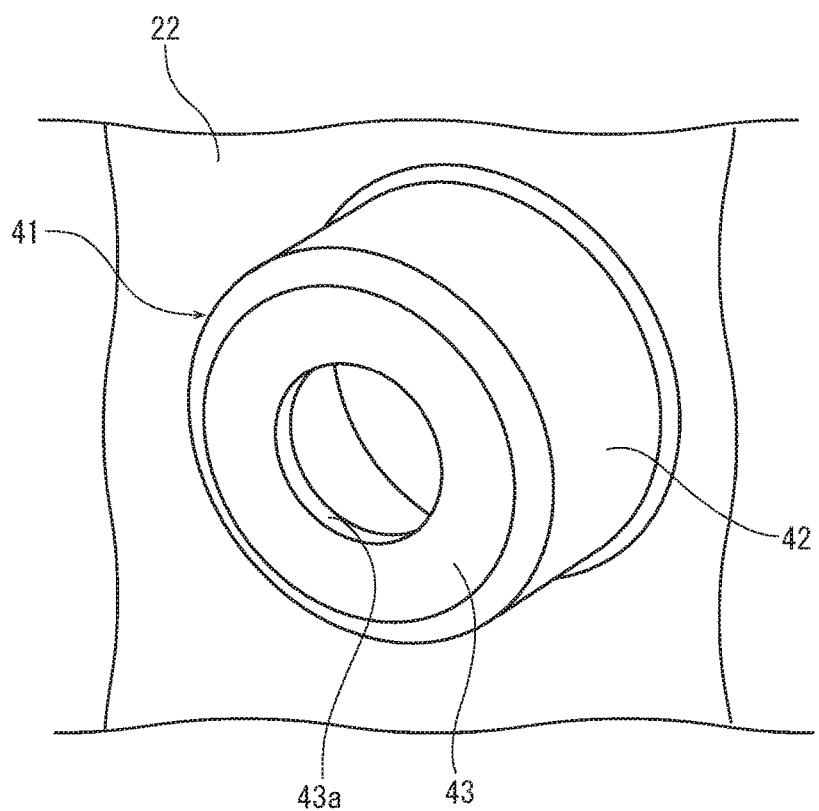
FIG. 5 is a perspective view showing the bearing part in the rotating force transmitting mechanism of the color printer according to the first embodiment of the present invention.

As shown in FIG. 4 and FIG. 5, the inner plate 22 is formed with a cylindrical shaped bearing part 41 protruding from the inner plate 22 at a position at which the idle gear 31 is to be disposed. The bearing part 41 has a cylindrical side wall portion 42 erected substantially perpendicularly from the inner plate 22 and a circular bottom wall portion 43. At the center of the bottom wall portion 43, a circular aperture 43a is formed.

Figure 6:
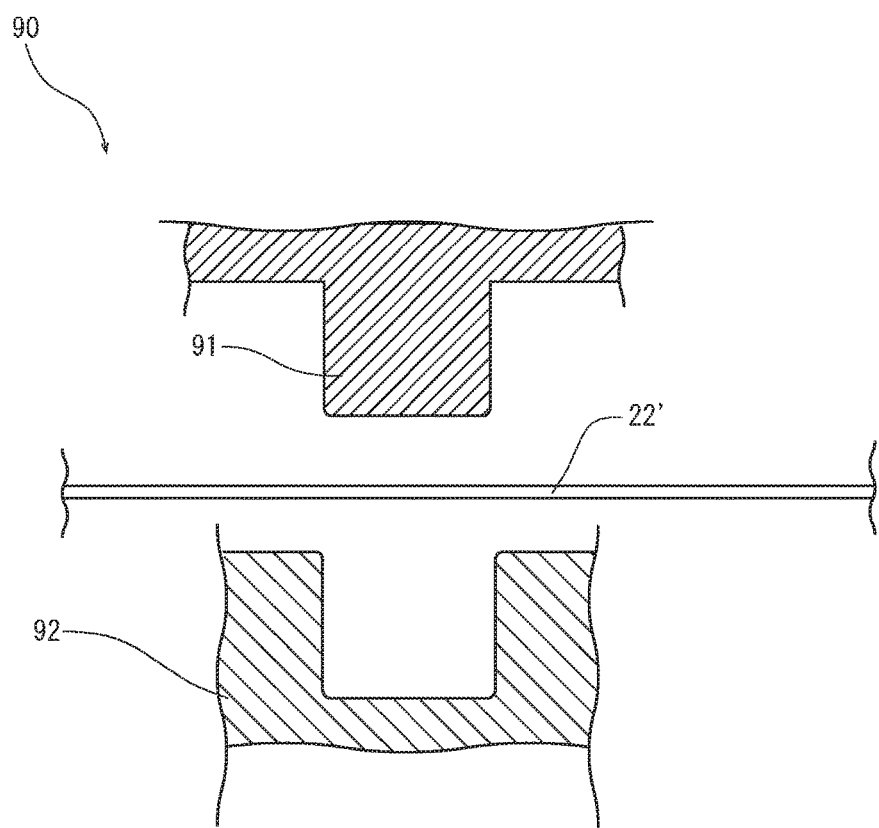
FIG. 6 is a view schematically showing a deep drawing machine which processes the bearing part in the rotating force transmitting mechanism of the color printer according to the first embodiment of the present invention.

The bearing part 41, as shown in FIG. 6, is formed by extruding the inner plate 22 using a deep drawing machine 90. The deep drawing machine 90 includes a columnar upper die 91 and a lower die 92 having a circular depression in a planar shape. Between the upper die 91 and the lower die 92, a metal plate 22' employed as a material for the inner plate 22 is disposed and the upper die 91 is lowered toward the lower die 92, and the bottomed cylindrical bearing part 41 is thereby formed in the metal plate 22'.

Figure 7:
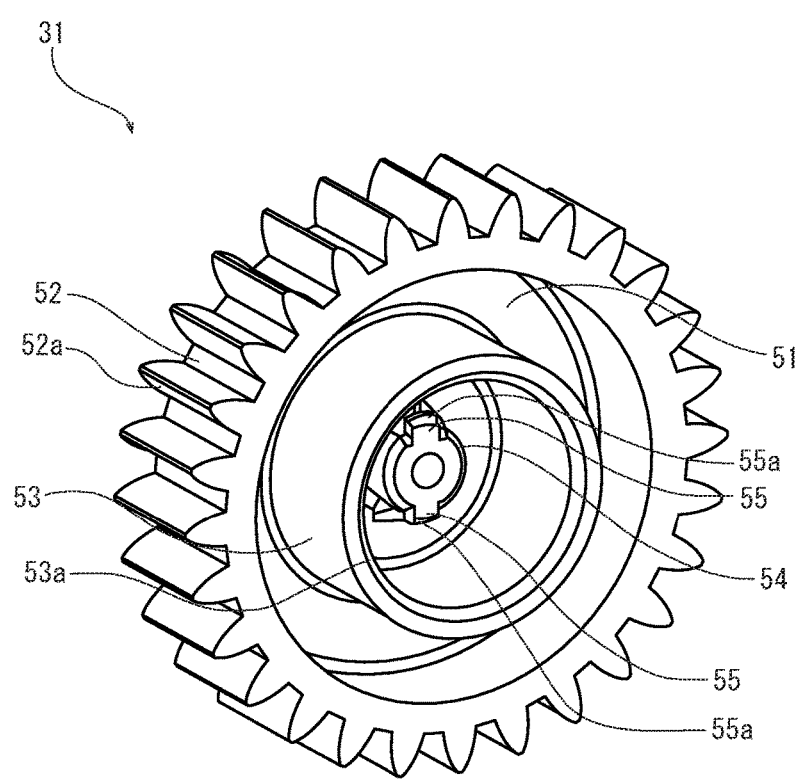
FIG. 7 is a perspective view showing the idle gear in the rotating force transmitting mechanism of the color printer according to the first embodiment of the present invention.

As shown in FIG. 4 and FIG. 7, the idle gear 31 has a disk-shaped base part 51 with a predetermined thickness, an cylindrical outer circumferential part 52 with a predetermined thickness erected substantially perpendicularly from the outer circumferential edge of one face of the base part 51, a cylindrical rotating shaft part 53 erected coaxially with the center of the base part 51 inside the outer circumferential part 52 and a substantially cylindrical boss part 54 erected coaxially with the center of the base part 51 inside the rotating shaft part 53. Namely, the outer circumferential part 52, the rotating shaft part 53 and the boss part 54 are formed concentrically with the center of the base part 51.

Around the outer face of the outer circumferential part 52, gear teeth 52a extending radially are formed at predetermined pitches.

The rotating shaft part 53 has an inner diameter substantially equal to an outer diameter of the side wall portion 42 of the bearing part 41 formed in the inner plate 22 so as to be capable of fitting to the bearing part 41. Also, the rotating shaft part 53 is formed to be higher than the bearing part 41 and the outer circumferential part 52. Around the inner circumferential edge of the tip end face of the rotating shaft part 53, a tapered inclined face 53a is formed.

The boss part 54 has a height substantially half of that of the rotating shaft part 53 and an outer diameter smaller than the inner diameter of the aperture 43a of the bearing part 41. At the tip end of the boss part 54, claw portions 55 diagonally projecting in a radial direction are formed. At the outer edge of the tip end face of the claw portion 55, a tapered inclined face 55a is formed. The claw portions 55 are formed such that a distance between the claw portions 55 in a planar view is larger than the inner diameter of the aperture 43a of the bearing part 41.

The idle gear 31 is formed by injection molding employing a plastic material, for example.

In order to support the idle gear 31 having the above construction to the bearing part 41, firstly, the rotating shaft part 53 of the idle gear 31 is fitted to the bearing part 41. Then, the tip end portion of the boss part 54 is fitted into the aperture 43a of the bottom wall portion 43, and the inclined faces 55a of the claw portions 55 abut against the periphery of the aperture 43a. When the rotating shaft part 53 is further fitted, the inclined faces 55a of the claw portions 55 are pressed against the periphery of the aperture 43a, and the boss part 54 is compressed in the radial direction by the claw portions 55 while elastically deforming so as to be fitted into the aperture 43a.

When the claw portions 55 are completely fitted into the aperture 43a, the boss part 54 elastically deforms in its original state so that the claw portions 55 engage with the peripheral of the aperture 43a of the bearing part 41. Afterwards, the bearing part 41 is fitted to the rotating shaft part 53 of the idle gear 31, and the idle gear 31 is rotatably supported on the bearing part 41. At this juncture, almost the entire area of the bearing part 41 in the height direction is fitted in the rotating shaft part 53 and the tip end face of the rotating shaft part 53 is close to the inner plate 22.

When the movable bar 25 (refer to FIG. 3) is driven, the idle gear 31 turns around the rotating shaft part 53 fitting to the bearing part 41. At this juncture, the inner circumferential face of the rotating shaft part 53 of the idle gear 31 slides with the outer circumferential face of the side wall portion 42 of the bearing part 41. Also, since the idle gear 31 is prevented from slipping off from the bearing part 41 by the claw portions 55 of the boss part 54, the idle gear 31 rotates without an occurrence of slipping off from the bearing part 41 or the like.

As described above, with the color printer 1 according to an embodiment of the present invention, since the idle gear 31 can be supported on the inner plate 22 in a cantilever manner without slipping off, space saving of the rotating force transmitting mechanism 20 and, therefore, downsizing of the color printer 1 can be achieved. Further, since the bearing part 41 is formed by extruding of a metal plate material, the number of parts and the process for forming the bearing part can be reduced and thus manufacturing costs can be reduced.

Furthermore, since the claw portions 55 are integrally formed with the idle gear 31 so as to prevent slipping off from the bearing part 41, there is no need to add new parts for preventing the slipping off. Also, when the claw portions 55 are engaged with the bearing part 41, the boss part 54 is easily compressed because of its cylindrical shape. Therefore, the claw portions 55 are easily engaged with the bearing part 41.

Incidentally, in the embodiment, although the idle gear 31 is prevented from slipping off from the bearing part 41 by the boss part 54 having the claw portions 55, another method can also be used as a method for preventing slipping off of the idle gear 31. For example, around the outer circumferential face of the side wall portion 42 of the bearing part 41 and the inner circumferential face of the rotating shaft part 53 of the idle gear 31, an annular depression and an annular protrusion which are capable of fitting to each other are formed respectively, and the protrusion and the depression are fitted to each other. This can prevent from slipping off of the rotating shaft part 53 from the bearing part 41. Alternatively, in place of the boss part 54 having the claw portions 55, the rotating shaft 53 and the bearing part 41 can be engaged with each other by employing a slip-stop pin.

Figure 13A:
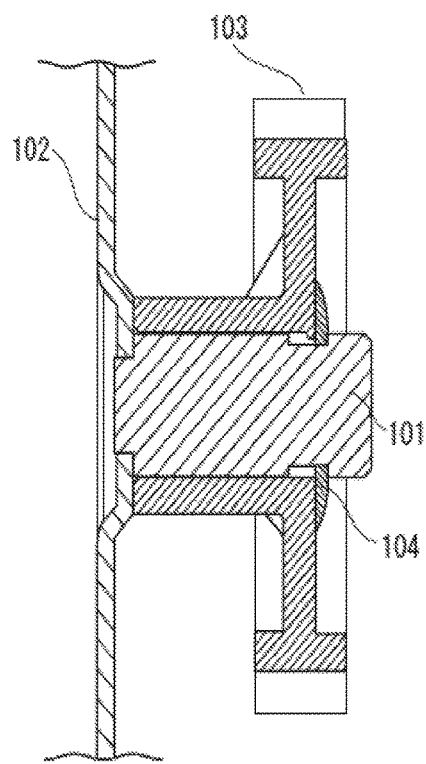
FIG. 13A is a sectional view showing the prior art using a caulking pin in a rotating force transmitting mechanism.
Figure 13B:
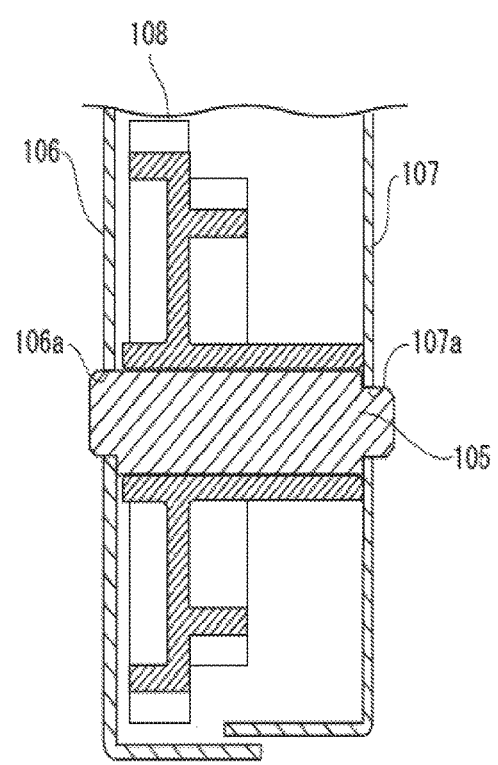
FIG. 13B is a sectional view showing the prior art using a plastic pin in the rotating force transmitting mechanism.

Further, as has been described with reference to FIG. 13A and FIG. 13B, in the method of supporting the rotating member in a cantilever manner by employing the caulking pin 101, processes of preparing the caulking pin 101 and fixing the caulking pin 101 to be pressed against the base plate 102 are required. However, in the embodiment, the bearing part 41 can be formed only by one process of subjecting the base plate to extruding. Therefore, in comparison with the method using the caulking pin 101, the number of parts and the number of forming process can be reduced and, therefore, cost reduction of the rotating force transmitting mechanism can be achieved.

Figure 8:
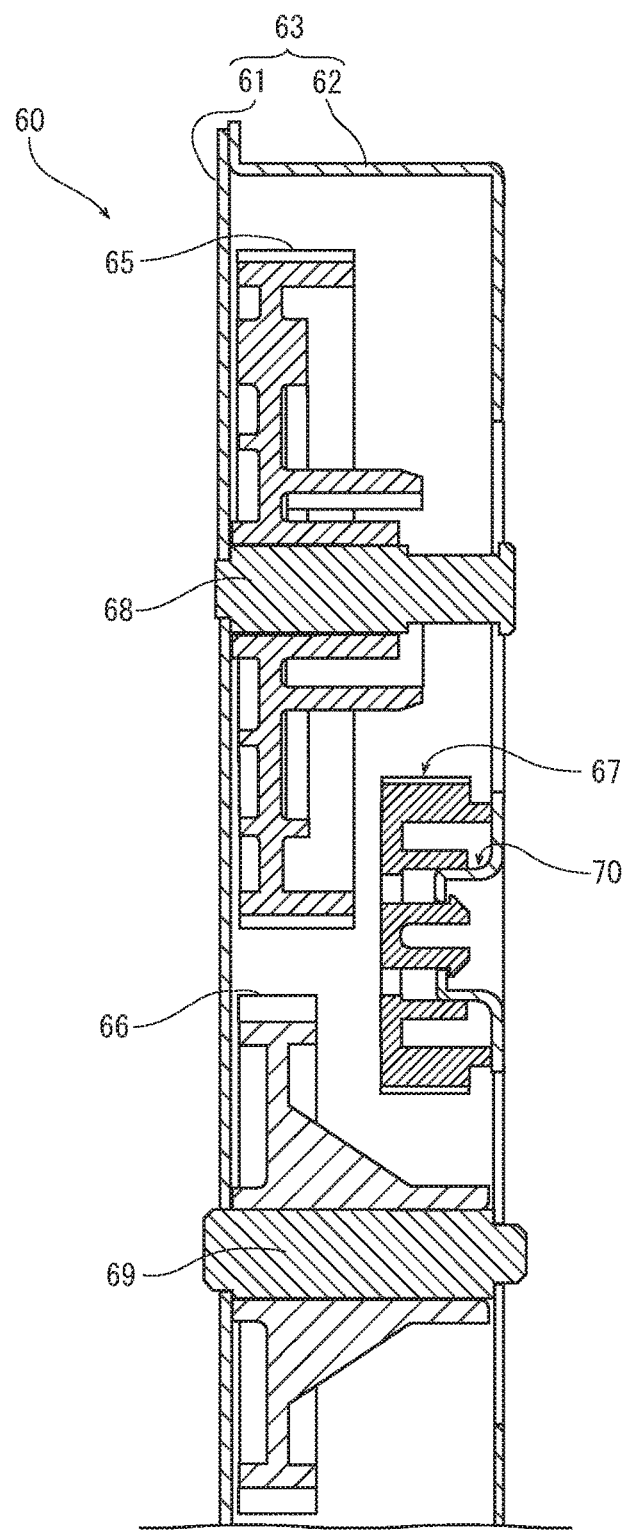
FIG. 8 is a sectional view showing a rotating force transmitting mechanism according to a second embodiment of the present invention.
Figure 10:
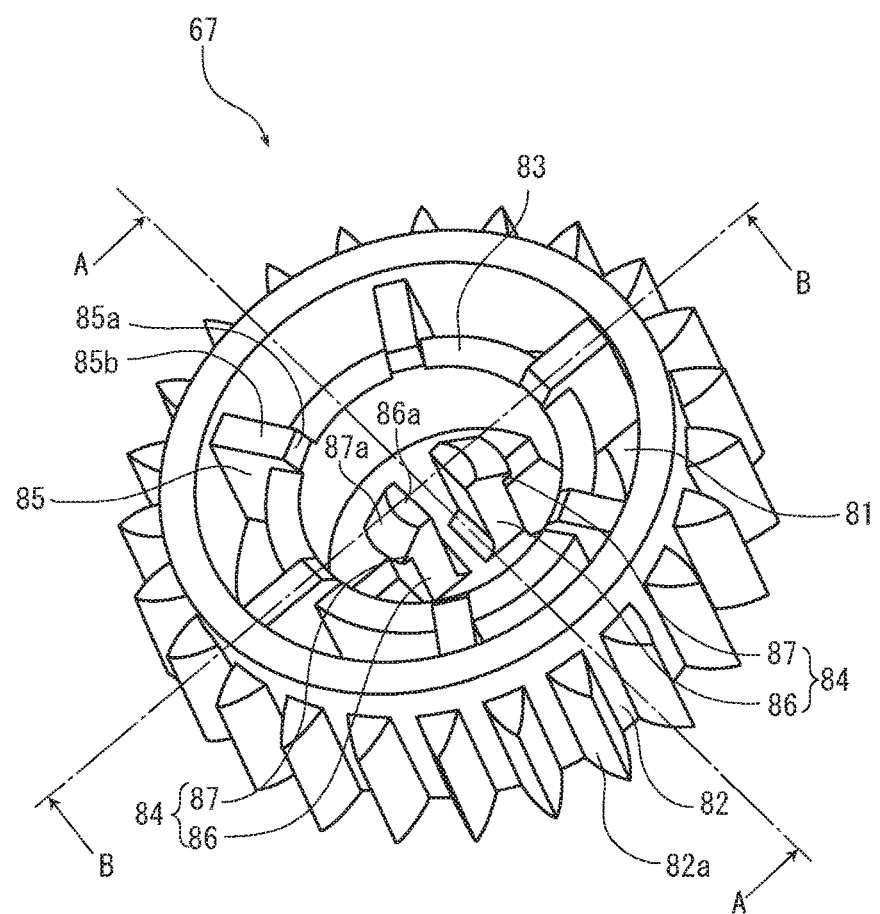
FIG. 10 is a perspective view showing the idle gear in the rotating force transmitting mechanism according to the second embodiment of the present invention.
Figure 11A:
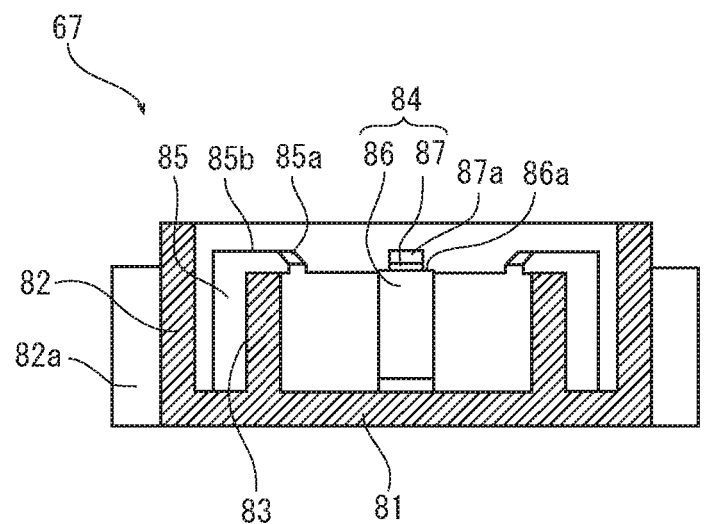
FIG. 11A is a sectional view taken along the line A-A of FIG. 10.
Figure 11B:
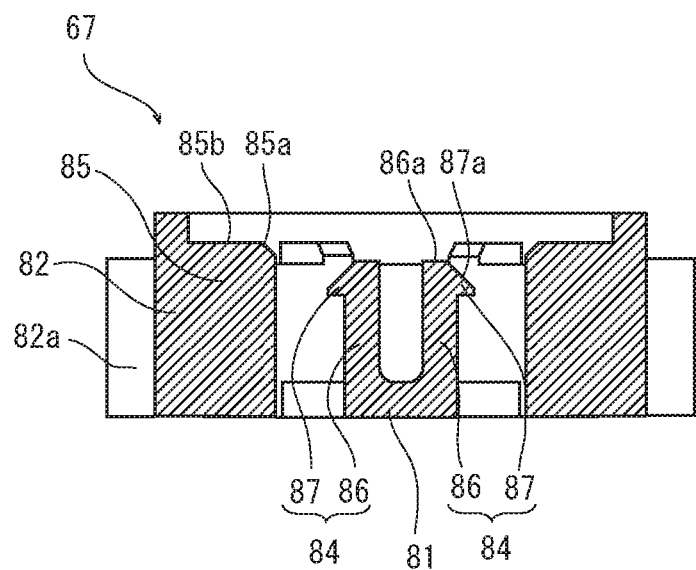
FIG. 11B is a sectional view taken along the line B-B of FIG. 10.

Next, with reference to FIG. 8 to FIG. 11B, a rotating force transmitting mechanism according to a second embodiment will be described. FIG. 8 is a sectional view of the rotating force transmitting mechanism, FIG. 9 is a side view showing a state in which an idle gear is supported, FIG. 10 is a perspective view of the idle gear, FIG. 11A is a sectional view of the idle gear taken along the line A-A and FIG. 11B is a sectional view of the idle gear taken along the line B-B.

The rotating force transmitting mechanism 60, as shown in FIG. 8, has a housing 63 composed of an inner plate 61 and an outer plate 62 oppositely disposed each other. The inner plate 61 and the outer plate 62 each are made of a metal plate material. In the housing 63, a first gear 65, a second gear 66 and an idle gear 67 are disposed.

The first gear 65 is rotatably supported on a rotating shaft 68 bridged between the inner plate 61 and the outer plate 62. The second gear 66 is rotatably supported on a rotating shaft 69 bridged between the inner plate 61 and the outer plate 62 on a side of the first gear 65. The idle gear 67 is rotatably supported to a bearing part 70 formed on the outer plate 62 between the first gear 65 and the second gear 66.

Figure 9:
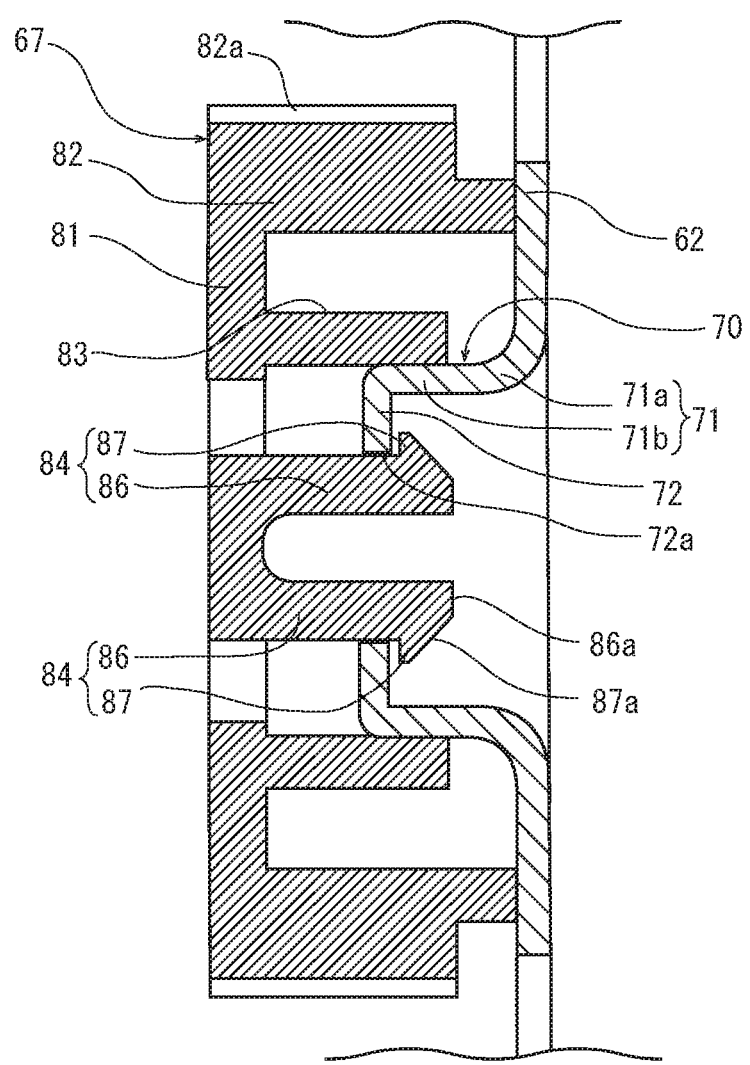
FIG. 9 is a sectional view showing a rotating shaft part of the idle gear and a bearing part of a base plate in the rotating force transmitting mechanism according to the second embodiment of the present invention.

As shown in FIG. 9, the bearing part 70 is formed in a bottomed cylindrical shape protruding from the outer plate 62 by extruding. The bearing part 70 has a substantially cylindrical side wall portion 71 erected from the outer plate 62 and a circular bottom wall portion 72.

The side wall portion 71 has a proximal portion 71a erected in a ¼ arc curved shape in a side view from the surface of the outer plate 62 so as to be gradually reduced in diameter toward the bottom wall portion 72 and a cylindrical distal portion 71b erected from the tip of the proximal portion 71a substantially perpendicular to the surface of the outer plate 62.

A circular aperture 72a is formed at the center of the bottom wall portion 72.

As shown in FIG. 9 to FIG. 11B, the idle gear 67 has a disk-shaped base part 81 with a predetermined thickness, an cylindrical outer circumferential part 82 with a predetermined thickness erected substantially perpendicularly from the outer circumferential edge of one face of the base part 81, a cylindrical rotating shaft part 83 erected coaxially with the center of the base part 81 inside the outer circumferential part 82 and a pair of protruding pieces 84 erected substantially perpendicular from the base part 81 at diagonal positions interposing the center of the base part 81 inside the rotating shaft part 83.

Around the outer face other than the tip portion of the outer circumferential part 82, gear teeth 82a extending radially are formed at predetermined pitches. The outer circumferential part 82 has a height higher than that of the bearing part 70.

The rotating shaft part 83 has an inner diameter substantially equal to an outer diameter of the distal portion 71b of the side wall portion 71 of the bearing part 70 so as to be capable of fitting to the distal portion 71b. The rotating shaft part 83 has a height lower than that of the outer circumferential part 82. Between the rotating shaft part 83 and the outer circumferential part 82, ribs 85 are radially formed at equal intervals at a predetermined central angle. The rib 85 has an inclined face 85a inclined in a direction in which a height thereof becomes higher from the tip end of the inner circumferential face of the rotating shaft part 83 outward in the radial direction and a horizontal face 85b extending from the tip edge of the inclined face 85a substantially in parallel to the base part 81.

The pair of protruding pieces 84 has a height substantially equal to that of the rotating shaft part 83. The pair of the protruding pieces 84 has leg portions 86 extending in parallel to each other and claw portions 87 projecting from the tip end of each leg portion 86 outward in the radial direction. The tip end face 86a of the leg portion 86 is formed so as to form a part of a circle having an inner diameter smaller than that of the aperture 72a of the bearing part 70. At the claw portion 87, an inclined face 87a is formed tapered toward the tip end face 86a of the leg portion 86. A distance between the outer faces of the leg portions 86 is smaller than the aperture 72a of the bearing part 70 and a distance between the outer edges of the claw portions 87 is larger than the aperture 72a of the bearing part 70.

In order to support the idle gear 67 having the above construction to the bearing part 70, as shown in FIG. 9, when the rotating shaft part 83 of the idle gear 67 is fitted to the bearing part 70, the tip end faces 86a of the leg portions 86 of the pair of protruding pieces 84 enter the aperture 72a of the bottom wall portion 72 of the bearing part 70 and the inclined faces 87a of the claw portions 87 abut against the periphery of the aperture 72a. When the rotating shaft part 83 is further fitted, the inclined faces 87a of the claw portions 87 are pressed against the peripheral of the aperture 72a and then the pair of protruding pieces 84 are elastically deformed inward to get into the aperture 72a.

When the claw portions 87 completely get into the aperture 72a, the pair of protruding pieces 84 elastically deform in its original state and the claw portions 87 engage with the peripheral of the aperture 72a. Afterwards, a portion close to the tip end of the rotating shaft part 83 of the idle gear 67 is fitted to the distal portion 71b of the side wall portion 71 of the bearing part 70. In this example, by rotation of the idle gear 67, the inner circumferential face of the portion close to the tip end of the rotating shaft part 83 slides with the outer circumferential face of the distal portion 71b of the side wall portion 71 of the bearing part 70.

In the embodiment, as shown in FIG. 8, the idle gear 67 can be disposed so as to be overlapped with the first gear 65 and the second gear 66 in the height direction of the housing 63 (in the direction of the rotating shaft of each gear). Namely, when the layout of each gear in the rotating force transmitting mechanism 60 is designed, each gear can be disposed in a space in the height direction as well as on a plane only. Therefore, space saving of the rotating force transmitting mechanism 60 becomes possible.

Furthermore, it is not necessary to fit the rotating shaft part 83 and the bearing part 70 to each other in the whole area in the axial direction, and as in the embodiment, it is sufficient to fit the rotating shaft part 83 and the bearing part 70 at a part in the axial direction. Thus, by fitting the rotating shaft part 83 to the bearing part 70 at a part in the axial direction, an area of a sliding area between the rotating shaft part 83 and the bearing part 70 is reduced. This can reduce a load exerted by the sliding. Therefore, durability of the idle gear 67 or the bearing part 70 can be improved and reliability of the rotating force transmitting mechanism 60 can be enhanced.

Furthermore, since the side wall portion 71 of the bearing part 70 has the tapered proximal portion 71a of a diameter gradually reduced toward the bottom wall portion 72, there is also an advantage that when the bearing part 70 is molded with a metal plate material, the upper die 91 (refer to FIG. 9) is easily pulled out. Therefore, the bearing part 70 can be formed more simply and easily.

Furthermore, in the embodiment, since the pair of protruding pieces 74 respectively deform individually, there is also an advantage that when the claw portions 87 are engaged with the bearing part 70, the pair of protruding piece 74 is easily deformed so that the claw portions 87 can be easily engaged with the bearing part 70.

FIG. 12 shows a modification example of the bearing part 70 of the rotating force transmitting mechanism 60 according to the second embodiment. In the bearing part 70 shown in FIG. 12A, the side wall portion 71 is formed so as to have a cylindrical proximal portion 71a erected substantially perpendicular from the outer plate 62 and a distal portion 71b.

In a case where the rotating shaft part 53 of the idle gear 31 is fitted to the bearing part 70, a portion close to the tip end of the inner circumferential face of the rotating shaft part 53 is fitted to the outer circumferential face of the proximal portion 71a of the side wall portion 71 of the bearing part 70 and is spaced from the outer circumferential face of the distal portion 71b. In addition, by rotation of the idle gear 31, the portion close to the tip end of the inner circumferential face of the rotating shaft part 53 slides with the outer circumferential face of the proximal portion 71a of the side wall portion 71 of the bearing part 70.

In addition, in this example, as shown in FIG. 12B, in the rotating shaft part 53 of the idle gear 31, at a corner between the inner face of the base part 51 and the rotating shaft part 53, an inclined face 53a may be formed opposing to the distal portion 71b of the side wall portion 71 of the bearing part 70 with a predetermined interval.

By forming such shape as well, the area of the sliding area of the rotating shaft part 53 and the bearing part 70 is reduced. This can reduce the load exerted by sliding. Further, there is also an advantage that when the bearing part 70 is molded with a metal plate material, a die can be easily drawn.

Although, in the foregoing description, there was set forth a case in which the rotating force transmitting mechanism of the embodiment was applied to the color printer 1, the rotating force transmitting mechanism of the embodiment can be applied to equipment or facilities having a construction to transmit the rotating force via the rotating member supported on the base plate, such as a recording and reproducing apparatus or audio modalities or the like.

While the preferable embodiment and its modified example of the image forming apparatus of the present invention have been described above and various technically preferable configurations have been illustrated, a technical range of the invention is not to be restricted by the description and illustration of the embodiment. Further, the components in the embodiment of the invention may be suitably replaced with other components, or variously combined with the other components. The claims are not restricted by the description of the embodiment of the invention as mentioned above.

The invention claimed is:

1. A rotating force transmitting mechanism which transmits a rotating force from a driving source to a driven member via a rotating member supported on a base plate, wherein
   the base plate is formed with a bearing part protruded by extruding, the bearing part having a bottom and being cylindrical,
   the rotating member is formed with a cylindrical rotating shaft part capable of fitting to the bearing part, and
   the rotating member is supported on the base plate such that the rotating shaft part rotates while sliding with the bearing part, wherein
   the bearing part is formed with an aperture at a center of the bottom,
   the rotating shaft part is formed with a protruding part which is provided coaxially with the rotating shaft part inside the rotating shaft part and capable of being inserted into the aperture, the protruding part having a claw portion which has a diameter larger than an inner diameter of the aperture and is capable of elastically deforming in a radial direction, a tapered inclined face is formed around the inner circumferential edge of the tip end face of the rotating shaft part, and the engagement of the claw portion with the bearing part prevents slipping off of the rotating member from the bearing part.

2. The rotating force transmitting mechanism according to claim 1, wherein
the bearing part and the rotating shaft part are configured to slide along at least at a part in an axial direction of the bearing part and the rotating shaft part.

3. The rotating force transmitting mechanism according to claim 1, wherein
the bearing part has a proximal portion erected in an arc curved shape in a side view from the base plate so as to be reduced in diameter toward the bottom and a distal portion substantially perpendicular to the base plate.

4. The rotating force transmitting mechanism according to claim 1, wherein
the bearing part has a proximal portion erected substantially perpendicularly from the base plate and a distal portion inclined along the tapered inclined face.

5. The rotating force transmitting mechanism according to claim 1, wherein
the rotating member has an outer circumferential part coaxially with the rotating shaft part outside the rotating shaft part and having gear teeth around the outer circumferential face and between the rotating shaft part and the outer circumferential part, a plurality of ribs is formed radially.

6. The rotating force transmitting mechanism according to claim 1, wherein
the rotating member is an idle gear.

7. The rotating force transmitting mechanism according to claim 6, wherein
the driven member includes a rotating shaft of a photosensitive drum and a rotating shaft in a development device, and the idle gear engages with a gear which is provided at the rotating shaft of the photosensitive drum and a gear which is provided at the rotating shaft in the development device.

8. An image forming apparatus provided with the rotating force transmitting mechanism according to claim 1.

* * * * *